I. C. WOODWARD.
DIFFERENTIAL GEARING.
APPLICATION FILED DEC. 22, 1916.
1,377,380.
Patented May 10, 1921.
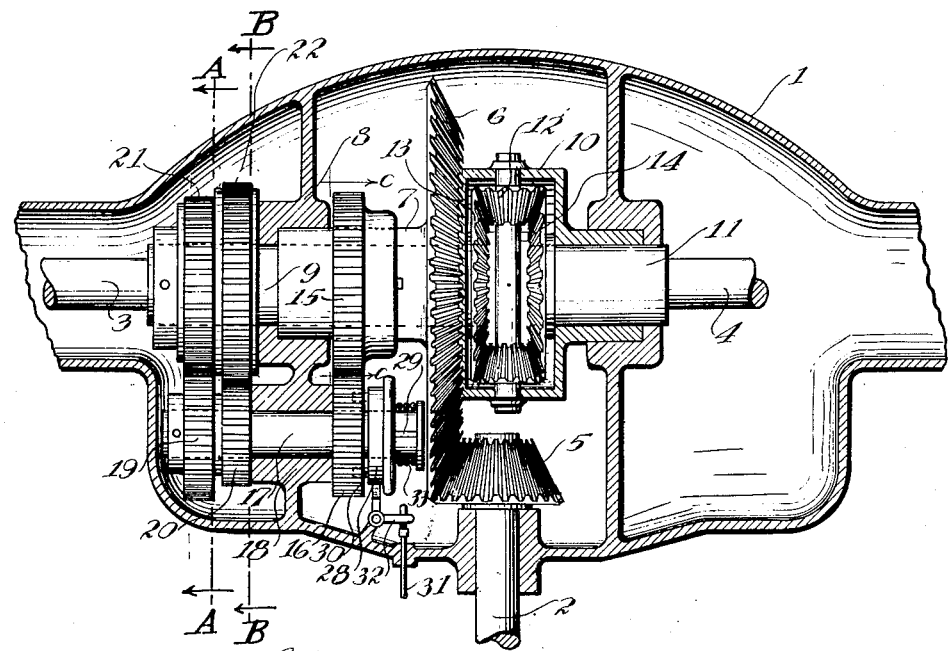
Fig. 1
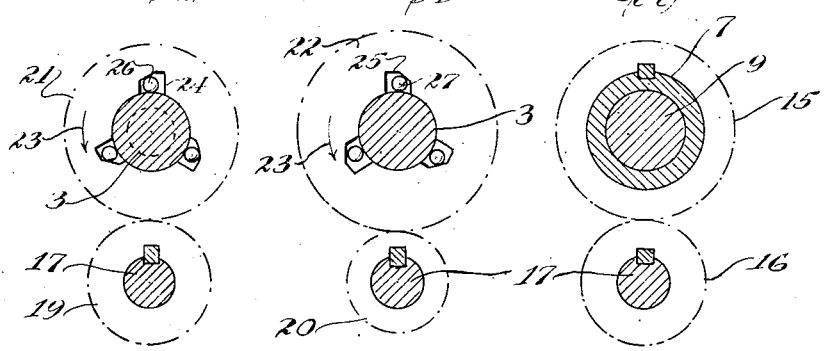
Fig. 2 (A-A). Fig. 3 (B-B). Fig. 4 (C-C).
WITNESSES:
George E. Schutz
INVENTOR.
Irving C. Woodward
BY
ATTORNEYS.

UNITED STATES PATENT OFFICE.

IRVING C. WOODWARD, OF CHICAGO, ILLINOIS, ASSIGNOR TO WOODWARD DIFFERENTIAL GEAR CO., OF CHICAGO, ILLINOIS, A CORPORATION OF ILLINOIS.

DIFFERENTIAL GEARING.

1,377,380.          Specification of Letters Patent.      Patented May 10, 1921.

Application filed December 22, 1916. Serial No. 138,347.

*To all whom it may concern:*

Be it known that I, IRVING C. WOODWARD, a citizen of the United States of America, and a resident of Chicago, county of Cook, and State of Illinois, have invented certain new and useful Improvements in Differential Gearings, of which the following is a specification.

This invention relates to differential gears of the type commonly employed in power driven road vehicles.

The main objects of the invention are to provide a differential gear wherein the free rotation of one of the driven axles is restrained as required to prevent racing of such axle when its wheel is relieved of normal frictional adherence to the road; and to provide means for insuring the positive rotation of the more retarded driven axle under such conditions.

An illustrative embodiment of this invention is shown in the accompanying drawings, in which:

Figure 1 is a sectional plan view of a differential gearing constructed according to this invention.

Fig. 2 is a sectional view on the line A—A of Fig. 1.

Fig. 3 is a sectional view on the line B—B of Fig. 1.

Fig. 4 is a sectional view on the line C—C of Fig. 1.

The well-known differential gears now commonly in use on power driven road vehicles operate to produce the required differential action, provided the frictional engagement with the road or both of the driven wheels is substantially equal, but it is well known that if one wheel rises clear of the road it may race, and likewise when the road is in a slippery condition the vehicle may skid, due to the almost complete loss of tractive power, by one of the wheels racing and the other remaining substantially at rest. The present arrangement of gearing provides means for permitting the usual differential action between driven axles or wheels, so that the vehicle may make the shortest turn for which it is designed, or longer turns. The construction, however, limits the differential action which may take place between the driven axles, so as to at all times insure that the required tractive power occurs at each wheel.

Various automatic and manually controlled means heretofore have been provided in differential gearing for preventing differential action by locking the two driven shafts so that the drive shaft may, if desired, transmit the same amount of power to each of the driven wheels. The present invention differs from such differential lock constructions in that it provides means for controlling the relative speeds between the driven shafts and the power respectively transmitted to such shafts, by restraining or accelerating their respective rotation when the rate of either shaft exceeds or falls below certain predetermined limits with respect to the rotation of the engine shaft. This arrangement permits only a limited differential action between the driven shafts. Various mechanical or other means may be provided for obtaining this end. The one shown in the drawings consists of driven mechanical clutch members which have different rates of speed with respect to the engine shaft, and which become effective to accelerate or restrain the rotation of one of the differential shafts when the latter shaft falls below or exceeds some predetermined speeds relatively to the speed of the engine shaft.

1 represents the usual housing and bearing member for the differential gears. The power shaft 2 for transmitting power from the engine to the differential shafts 3 and 4, is journaled at one end in housing 1 and carries a beveled pinion 5 meshing with a large beveled gear 6. The hub 7, which is rotatable within the bearing member 8, surrounds an enlarged portion 9 of shaft 3. The gear 6 is loose on shaft 3, and fast to the gear 6 is a housing 10 which is journaled on the enlarged portion 11 of shaft 4. Journaled in the housing 10 are a plurality of planetary beveled pinions 12 meshing with the beveled gears 13 and 14, which are respectively fast to the shafts 3 and 4. The gearing so far described is similar in principle of operation to many well-known forms of differential gears. The power which is transmitted to gear 6 is, through the housing 10 and pinions 12, by the revolving motion of the pinions, normally transmitted in equal amounts to shafts 3 and 4. If the frictional engagement of one of the driven wheels respectively on shafts 3 and 4 exceeds the other, the speeds of the the driven shafts will vary accordingly, due to the fact that the pinions 12 rotate around the more-retarded gear 13 or 14 and thereby increase the speed of the less-retarded gear.

The means provided for controlling the differential action of the above described gearing comprises gear 15 fast to the hub 7 of gear 6 and meshing with a slightly smaller gear 16 normally fast to a jack-shaft 17 journaled in the part 18 of the housing 1 and parallel with the shafts 3 and 4. Also fast on shaft 17 are a pair of gears 19 and 20 of different diameters and respectively meshing with gears 21 and 22 journaled on the part 9 of shaft 3 and having diameters which are complemental to the diameters of gears 19 and 20. By this arrangement the rate of rotation of jack-shaft 17 varies in exact accordance to the rate of rotation of the power shaft 2. The rate of rotation of gears 21 and 22 is likewise proportional to the rate of rotation of the power shaft, but the speed of gear 21 always exceeds the speed of gear 22. Shafts 3 and 4 when the load is equally divided between these shafts, rotate faster than gear 22 and slower than gear 21. The normal forward direction of rotation of the shafts 3 and 4 and the gears 21 and 22 is as indicated by the arrows 23 in Figs. 2 and 3, and these gears are provided with oppositely formed inclined recesses 24 and 25 in which are located roller clutching members 26 and 27. Accordingly so long as the speed of gear 21 exceeds the speed of shaft 3 the roller clutch members 26 will not be effective to clutch the gear 21 to the shaft, and the clutch member 27 will be ineffective when the shaft 3 rotates faster than gear 22. For example if the speed of shaft 3 is 100 R. P. M. the speeds of gears 21 and 22 may be respectively 119 and 78½ R. P. M. without the clutches in said gears becoming effective. However, if the speed of shaft 3, according to differential action taking place between shafts 3 and 4, exceeds the speed of gear 21 or falls below the speed of gear 22, the clutches in one or the other of these gears will become effective to clutch such gear to shaft 3. If the shaft is clutched to gear 21 its speed will then be retarded to the speed of gear 21, which receives its power through the jack-shaft 17 and gears 15 and 16 direct from the power shaft. If the gear 22 becomes clutched to shaft 3, due to the fact that shaft 3 attempts to rotate slower than gear 22, the power to the shaft will be transmitted through the jack-shaft and gear 22, so that shaft 3 will be compelled to rotate at the speed of gear 22.

Means are provided for disabling the driving connection between the jack-shaft and gear 15 when the vehicle is driven backwardly. This means comprises a slidable member 28 which is compelled to rotate with shaft 17 by a feather connection 29 therewith, but has clutch teeth 30 for engagement with gear 16 which is loose on shaft 17. When the controlling lever of the vehicle is moved to the reverse position, it causes disengagement of clutch member 28 from gear 16 through the link 31 and bell-crank 32. The clutch is normally held in engagement with the gear 16 by spring 33.

In the operation of the device, the large gear 6 is rotated according to the speed of shaft 2, and through the planetary pinions 12 which are carried by the gears 6. The power is transmitted to the gears 13 and 14 on shafts 3 and 4, so that these shafts will each receive an equal amount of power provided the tractive resistance to the respective wheels on said shafts is equal. When the vehicle is driven in a curve the wheel having a path of lesser radius slows down accordingly, while the wheel going through the path of greater radius increases its speed slightly as permitted by the rolling action taking place between the planetary pinions 12 and the gears 13 and 14. If, due to road conditions or the manner of controlling the vehicle, one of the driven wheels loses its frictional adherence to the road to such an extent that it begins to race, the result will be that shaft 3 will either decrease in speed or increase in speed to such an extent that one of the clutches in either gear 21 or 22 becomes effective to insure a minimum speed or retard the speed of shaft 3 to some predetermined relationship to the speed of the power shaft 2, and accordingly as the positive driving of shaft 3 will, through the differential gearing, result in a positive driving of shaft 4, power will be transmitted to both shafts 3 and 4 in the required proportions, so as to insure a tractive action of both driven wheels and prevent skidding or racing of one of them.

It will be understood that in all cases, whether or not there is a differential action between the shafts 3 and 4, the gears 6, 15, 20, 19, 21 and 22 will always rotate at a definite speed relationship with shaft 2, the gearing being so arranged that gear 21 rotates faster than the normal rate of shaft 3, while gear 22 rotates slower.

Assuming, for example, that shaft 4 is considerably retarded and that the pinions 12 revolve on the gear 14, increasing the speed of gear 13 and shaft 3 to such an extent that the clutch between the shaft 3 and gear 21 becomes effective. Thus further increase in the speed of shaft 3 is prevented, since it may not exceed the speed of gear 21. In this manner, the amount of rolling action of the pinions 12 on gear 14 is limited to permit of only some predetermined excess in the speed of shaft 3 over the speed of shaft 4.

In another example, the shaft 3 may be the more retarded shaft, in which case the pinions 12 will roll to some extent on the gear 13, thus increasing the speed of shaft 4. As is usual with differential gearing, the shaft 4 will continue to increase in speed proportionately to the resistance offered to the rotation of shaft 3, but in the present gearing, the difference in speeds attainable by the said shafts is limited by the fact that when shaft 3 decreases in speed to such an extent that its speed is equal to the speed of gear 22, the clutch in said gear becomes effective to grip shaft 3 and compel it to rotate at the speed of the gear. Thus, in this instance, the rolling action of pinions 12 on the gear 13 is limited, as desired to insure power being transmitted to both shafts 3 and 4 at all times.

Although but one specific embodiment of this invention has been herein shown and described, it will be understood that numerous details of the construction shown may be altered or omitted without departing from the spirit of this invention as defined by the following claims.

I claim:

1. A device of the class described, comprising differential gearing and a pair of driven shafts connected thereby, means for driving said gearing, a pair of clutches mounted on one of said shafts, and means whereby said clutches are respectively driven faster and slower than the shaft upon which they are mounted, each of said clutches being arranged to grip the shaft and drive it when the speed of the shaft is approximately the same as the respective clutch.

2. A device of the class described, comprising a pair of shafts, differential gearing between said shafts, means for driving said differential gearing, a jack-shaft, means for driving said jack-shaft, and a pair of normally inactive clutches rotatably mounted on one of said pair of shafts and arranged to be driven at different speeds by said jack-shaft, each of said clutches being arranged to become effective to grip and drive the shaft upon which they are mounted when the speed of said shaft is approximately the speed of the respective clutches.

3. The combination of a pair of driven members, differential mechanism for driving said members, a pair of driven clutches coöperating with said driven members and arranged to operate in opposite directions, each of said clutches comprising two parts, and means for driving one part of each clutch at a fixed speed ratio to the driven member which it controls, the remaining part of one clutch at a greater speed and the remaining part of the other clutch at a less speed than the average speed of the two driven members.

Signed at Chicago this 18th day of December 1916.

IRVING C. WOODWARD.